United States Patent [19]

DuPuy et al.

[11] Patent Number: 5,020,872
[45] Date of Patent: Jun. 4, 1991

[54] METHOD OF OPERATING AN ELECTROOPTIC MODULATOR

[75] Inventors: Richard E. DuPuy, Aloha; John D. Liebenrood, Portland, both of Oreg.; Leon McCaughan, Madison, Wis.

[73] Assignee: Smiths Industries Aerospace & Defense Systems Incorporated, Grand Rapids, Mich.

[21] Appl. No.: 460,761

[22] Filed: Jan. 4, 1990

[51] Int. Cl.$^5$ .............................................. G02B 6/10
[52] U.S. Cl. .................................. 350/96.14; 455/611
[58] Field of Search ............... 350/96.11, 96.12, 96.13, 350/96.14; 455/600, 608, 611; 372/33

[56] References Cited

U.S. PATENT DOCUMENTS

| | | | |
|---|---|---|---|
| 3,121,169 | 2/1964 | Benton | 250/199 |
| 3,579,145 | 5/1971 | Lange | 455/616 |
| 3,714,437 | 1/1973 | Kinsel | 250/199 |
| 4,397,042 | 8/1983 | Tsujii et al. | 455/608 |
| 4,442,528 | 4/1984 | Fukuda | 375/20 |
| 4,475,212 | 10/1984 | McLean et al. | 375/17 |
| 4,524,462 | 6/1985 | Cottatelucci | 455/608 |
| 4,545,078 | 10/1985 | Wiedeburg | 455/600 |
| 4,709,417 | 11/1987 | Kuwabara | 455/611 |
| 4,775,208 | 10/1988 | Robinson et al. | 350/96.14 |

OTHER PUBLICATIONS

T. Fujiwara et al., "Suppression of Crosstalk Drift in Ti:LiNbO$_3$ Waveguide Switches", IEEE J. Lightwave Tech., vol. 6, No. 6 (1988).

C. M. Gee et al., "Minimizing dc Drift in LiNbO$_3$ Waveguide Devices", Appl. Phys. Lett., vol. 47, 211 (1985).

G. Ramer et al., "Polarization-Independent Optical Switch with Multiple Sections of $\Delta\beta$ Reversal and a Gaussian Taper Function", IEEE Trans. Microwave Theory and Tech., vol. MTT-30, 1760 (1982).

*Primary Examiner*—Frank Gonzalez
*Attorney, Agent, or Firm*—Dellett, Smith-Hill and Bedell

[57] ABSTRACT

An electrooptic directional coupler having first and second electrodes for influencing coupling between a segment of a first optical waveguide and a segment of a second optical waveguide, is operated by varying the potential of the first electrode relative to the second electrode during a first interval in accordance with a first function such that the first electrode remains at a first polarity relative to the second electrode, and varying the potential of the first electrode relative to the second electrode during a second interval in accordance with a second function such that the first electrode remains at a second polarity, opposite the first polarity, relative to the second electrode. The integral with respect to time over the first and second intervals of the potential of the first electrode relative to the second electrode is essentially zero.

19 Claims, 2 Drawing Sheets

METHOD OF OPERATING AN ELECTROOPTIC MODULATOR

BACKGROUND OF THE INVENTION

This invention relates to a method of operating an electrooptic modulator.

FIG. 1 illustrates an optical switch 2 that may be used in an optical time domain reflectometer (OTDR) to control propagation of light from a laser diode 4 to a fiber under test 6 and from the fiber under test to a detector 8, such as an avalanche photodiode. The switch shown in FIG. 1 comprises a substrate 10 of Z-cut LiNbO$_3$ having diffused titanium waveguides 14-18 formed therein. Waveguides 14-18 form two directional couplers 26A, 26B. Electrodes 22, 24 are deposited over an SiO$_2$ buffer layer (not shown) and an electrode driver 30 is connected to electrodes 22, 24 and controls the state of the directional couplers and hence the state of the switch. The switch has a first state, in which the directional couplers are each in the bar state and light entering waveguide 14, for example, at one end is confined in that waveguide and leaves the waveguide at its opposite end, and a second state, in which the directional couplers are each in the cross state and light entering waveguide 14 from fiber 6 is transferred to waveguide 16 and is then transferred to waveguide 18 so that it is applied to detector 8.

The manner of operation of an electrooptic directional coupler is well understood. In a conventional electrooptic directional coupler, the waveguides are dimensioned and positioned so that the transmission from one waveguide to the other depends on the potential difference between the electrodes in the manner illustrated by the curve A in FIG. 2. At a potential difference of about zero volts, the transmission is a maximum, and it falls off symmetrically as a function of voltage. The coupler is placed in its cross state by holding the electrodes at the same potential, and is placed in the bar state by establishing a potential difference V, which is generally on the order of 25 volts, between the electrodes. Therefore, to place switch 2 in its first state, electrode driver 30 applies a potential +V to electrodes 24, electrodes 22 being grounded, and to place switch 2 in its second state, electrode driver 30 grounds electrodes 24.

Operation of laser diode 4 is controlled by timing control circuit 32. Thus, timing control circuit 32 generates pulses at an interval T of, say, 100 μs, and applies these pulses to a laser driver 36. In response to each pulse, laser driver 36 energizes laser diode 4, which emits a pulse of light having a duration that is typically 100 ns. The waveform of the signal applied to laser driver 36 is shown as curve A in FIG. 3. Timing control circuit 32 also controls operation of electrode driver 30, and hence switch 2. The waveform of the signal provided to electrode driver 30 by timing control circuit 32 might be as shown by the curve B in FIG. 3. For each pulse applied to laser driver 36, timing control circuit 32 applies a pulse 38 to electrode driver 30, which places switch 2 in its first state so that the light pulse from laser diode 4 is coupled through waveguide 14 and coupler 26B into fiber 6.

Following launch of a pulse into fiber 6, back-scattered and reflected light is received from fiber 6. The interval T between pulses applied to laser driver 36 is selected to be longer than the interval during which backscattered and reflected light is received from fiber 6. During intervals in which backscattered light is received from fiber 6, the switch is placed in its second state and light from the fiber under test is coupled to detector 8 through waveguide 14, coupler 26B, waveguide 16, coupler 26A and waveguide 18. The reflected light is generally of less interest than the backscattered light. Also, the reflected light is of much greater intensity than the backscattered light and may overdrive the detector. Therefore, timing control circuit 32 generates pulses 40 in response to reflection signals received from the fiber under test, and these pulses 40 are used to place the switch in its first state in order to isolate the detector from the fiber under test and thereby avoid overdriving of the detector. Therefore, the voltage applied to electrodes 24 is periodic, with a period T, and has a non-zero DC component. The manner in which the timing control circuit functions to mask receipt of reflection signals is well understood by those skilled in the art.

It has been found that some electrooptic directional couplers exhibit a slow drift in their transmission-vs.-voltage curve when the potential difference between the electrodes has a DC component. The curve shifts towards the bar state voltage of the original (unshifted) curve so that the cross and bar states occur at different drive voltages from before. A typical shifted curve is shown at B in FIG. 2. It is apparent from curve B that the drift results in a reduction in the transmission when electrodes 22, 24 are at the same potential and an increase in the transmission when electrode 24 is at a potential +V relative to electrode 22. Accordingly, the drift causes the performance of an optical switch employing electrooptic directional couplers to be degraded.

T. Fujiwara, S. Sato, H. Mori and Y. Fujii, "Suppression of Crosstalk Drift in Ti:LiNbO$_3$ Waveguide Switches", *IEEE J. Lightwave Tech.*, Vol. 6, No. 6 (1988) discusses the problem of drift and suggests that it is caused by leakage of current through the buffer layer. The leakage takes place under the influence of the voltage applied to the electrodes. In accordance with the disclosure in Fujiwara et al, the relaxation time of the drift is on the order of 20-30 s.

C. M. Gee, G. D. Thurmond, H. Blauvelt and H. W. Yen, "Minimizing dc drift in LiNbO$_3$ waveguide devices", Appl. Phys. Lett., Vol. 47, 211 (1985), describes use of indium tin oxide (ITO) as the buffer layer of an electrooptic modulator, and reports a dramatic reduction in both short term and long term DC drift of the modulator. However, use of the ITO buffer layer caused substantial attenuation compared to devices with an SiO$_2$ buffer layer. Also, an increase in the voltage required to achieve full modulation was observed, and it is to be expected that use of an ITO buffer layer would be attended by the disadvantage of increased thermal drift. (See co-pending U.S. patent application Ser. No. 07/460,759 filed Jan. 4, 1990 and still pending.

G. Ramer, C. Mohr and J. Pikulski, "Polarization-Independent Optical Switch with Multiple Sections of Δβ Reversal and a Gaussian Taper Function", IEEE Trans. Microwave Theory and Tech., Vol. MTT-30, 1760 (1982), describes a technique for testing an optical switch in which one electrode is grounded and periodic voltage signals are applied to the ungrounded electrode.

U.S. Pat. No. 4,997,245 the disclosure of which is hereby incorporated by reference herein, describes an optical switch comprising two directional couplers and having desirable characteristics of polarization independence and wavelength broadening. However, in order to achieve these advantages, the potential difference between the electrodes of each coupler is at a non-zero bias value when the coupler is in the cross state. Consequently, the DC level of the potential difference between the electrodes is substantially higher than in the case of the switch shown in FIG. 1.

SUMMARY OF THE INVENTION

In accordance with a first aspect of the invention, an electrooptic modulator comprising a body of electrooptic material having a waveguide formed therein is operated by establishing an electric field in a first direction in a length segment of the waveguide during a first interval and establishing an electric field in a second direction, opposite the first direction, in the length segment of the waveguide during a second interval. The electric field established during the first interval has one of at least two magnitudes at substantially all times during the first interval and has at least two of these magnitudes at different times in the first interval. Similarly, the electric field established during the second interval has one of at least two magnitudes at substantially all times during the second interval and has at least two of the latter magnitudes at different times in the second interval. The integral with respect to time over the first and second intervals of the field in the length segment of the waveguide is essentially zero.

In accordance with a second aspect of the invention, an electrooptic directional coupler comprising a body of electrooptic material having first and second waveguides formed therein, and first and second electrodes for influencing coupling between a segment of the first waveguide and a segment of the second waveguide, is operated by varying the potential of the first electrode relative to the second electrode during a first interval in accordance with a first function such that the first electrode remains at a first polarity relative to the second electrode, and varying the potential of the first electrode relative to the second electrode during a second interval in accordance with a second function such that the first electrode is at a second polarity, opposite the first polarity, relative to the second electrode. The integral with respect to time over the first and second intervals of the potential of the first electrode relative to the second electrode is essentially zero.

BRIEF DESCRIPTION OF THE DRAWINGS

For a better understanding of the invention, and to show how the same may be carried into effect, reference will now be made, by way of example, to the accompanying drawings in which.

In the several figures, like reference numerals designate components having corresponding functions and primed reference numerals designate components having similar, but different, functions or of similar, but different, construction.

DETAILED DESCRIPTION

Figure 3:
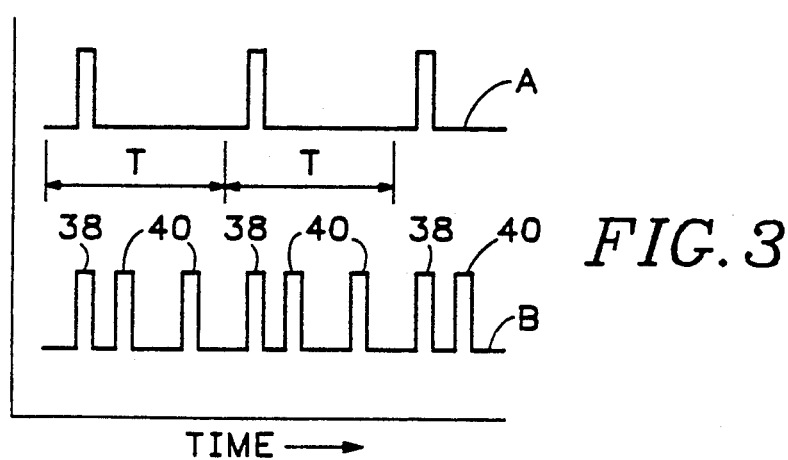
FIG. 3 is a graph illustrating voltage waveforms relevant to the operation of the OTDR shown in FIG. 1.
Figure 4:
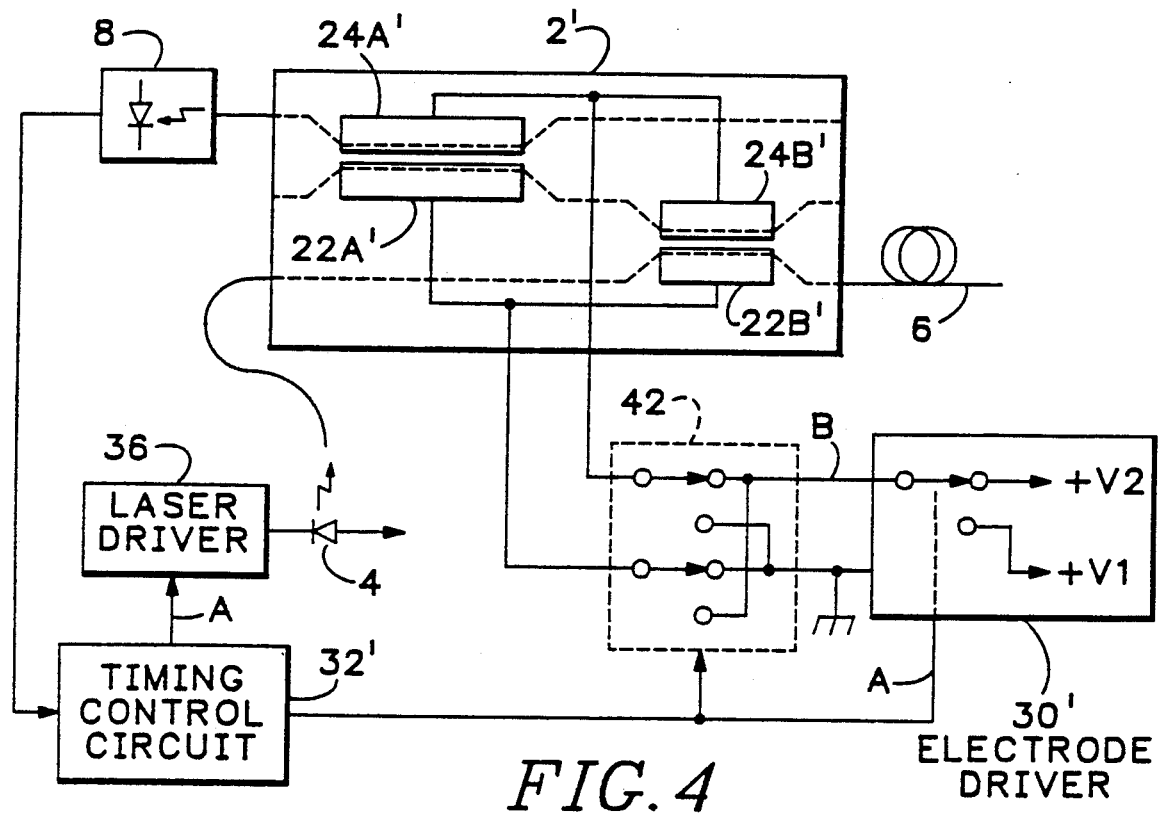
FIG. 4 illustrates an OTDR embodying the present invention.

The OTDR shown in FIG. 4 comprises an electrooptic switch 2' of the kind described in U.S. Pat. No. 4,997,245. Electrodes 22', 24' of switch 2' are connected to electrode driver 30 through a switch 42. The waveform of the output signal provided to electrode driver 30' by timing control circuit 32' might be as shown at A in FIG. 5, which is identical to waveform B in FIG. 3.

Figure 5:
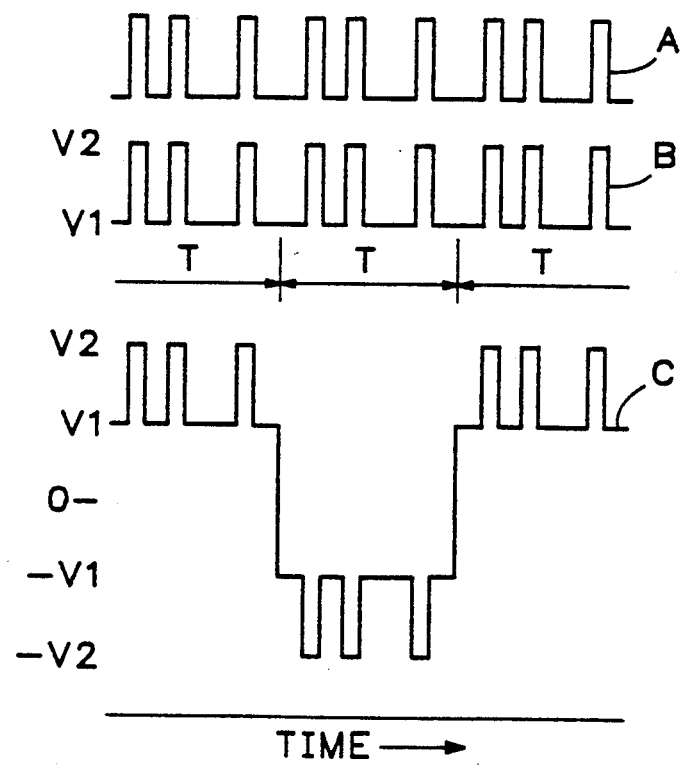
FIG. 5 is graph illustrating voltage waveforms relevant to the operation of the OTDR shown in FIG. 4.

One output terminal of electrode driver 30' is grounded, and the voltage waveform at the other terminal is shown in FIG. 5 as curve B, and it will be seen that the waveform is composed of pulses of voltage V2 superimposed on a bias voltage V1.

Figure 1:
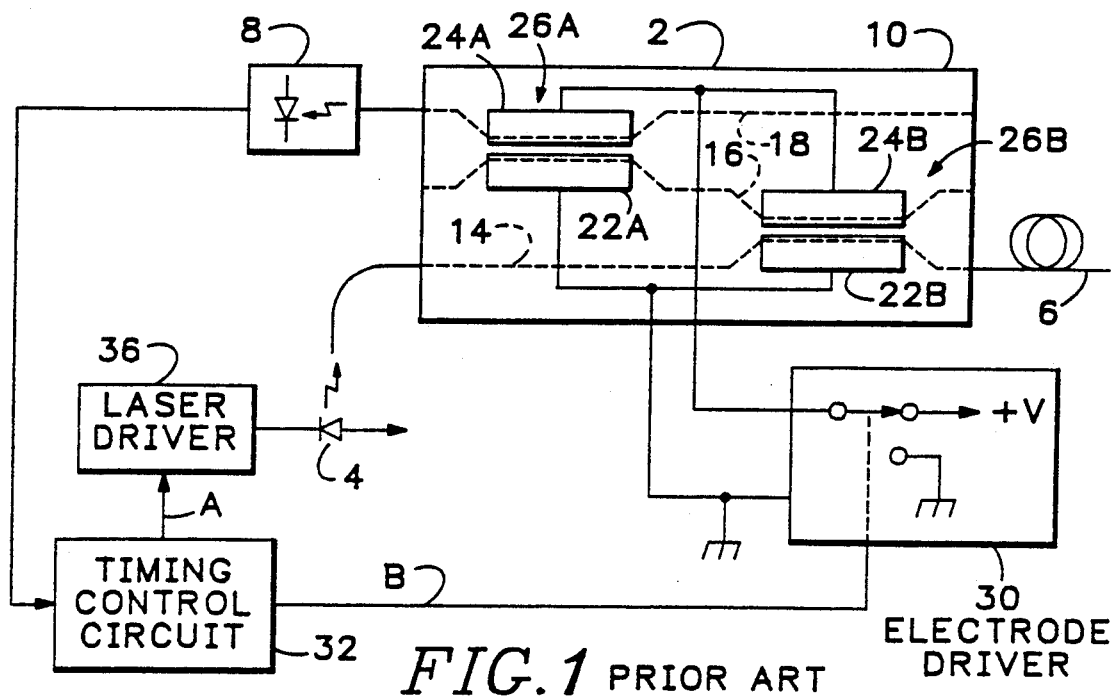
FIG. 1 is a simplified block diagram of an OTDR.
Figure 2:
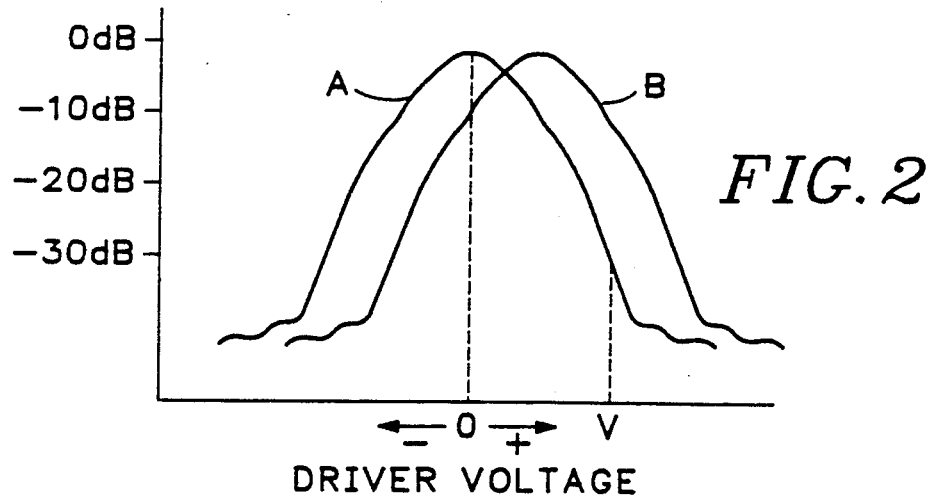
FIG. 2 illustrates the transmission curve of one of the directional couplers in the OTDR of FIG. 1.

At the end of each period T, timing control circuit 32' applies a switch reverse pulse to switch 42, which functions as a double pole, double throw switch. The terminals of switch 42 are connected to electrode driver 30' in a manner such that on each reversal of switch 42, the connections to the electrodes of optical switch 2' are reversed. Therefore, the potential of electrodes 22A', 22B' relative to electrodes 24A', 24B' varies in accordance with the waveform C shown in FIG. 5. When the ungrounded output terminal of electrode driver 30' is at the bias voltage, switch 2' is in the second state, and when the ungrounded terminal is at the voltage V2, switch 2' is in the first state. It can be seen that although the switch state changes with time in the same manner as in the case of FIG. 1, the potential difference between the electrodes reverses with a period T, and since the period T is much shorter than the relaxation time of the DC drift, no significant drift of the transmission curve occurs. The integral with respect to time of the potential difference between the electrodes is essentially zero for an interval 2T.

It will be appreciated that the invention is not restricted to the particular embodiment that has been described, and that variations may be made therein without departing from the scope of the invention as defined in the appended claims and equivalents thereof. For example, the invention is not limited in its application to an OTDR, but may be used in other apparatus that includes an electrooptic modulator that is normally driven by a signal having at least two discrete voltage levels and wherein the function that relates the operation of the modulator to voltage is an even function.

We claim:

1. A method of operating an electrooptic modulator comprising a body of electrooptic material having at least one waveguide formed therein, said method comprising:

during a first interval, establishing an electric field in a first direction in a length segment of the waveguide, the electric field having a first of at least two magnitudes during a first finite part of the first interval and a second of said magnitudes during a second finite part of the first interval, and during a second interval, establishing an electric field in a second direction, opposite said first direction, in said length segment of the waveguide, the electric field having a first of at least two magnitudes during a first finite part of the second interval and a second of the latter magnitudes during a second finite part the second interval, such that the integral with respect to time over the first and second intervals of the field in said length segment of the waveguide is essentially zero.

2. A method according to claim 1, which the durations of the first and second intervals are equal.

3. A method according to claim 1, wherein first and second electrodes are formed on the body of electrooptic material and the electric field is established by applying selected potentials to the first and second electrodes, and wherein the function that relates the potential of the first electrode relative to the second electrode to time during the first interval is equal to the function that relates the potential of the second electrode relative to the first electrode to time during the second interval.

4. A method of operating apparatus comprising a light source, an electrooptic directional coupler comprising a body of electrooptic material having first and second waveguides formed therein and first and second electrodes for influencing coupling between a segment of the first waveguide and a segment of the second waveguide, and means for establishing a potential difference between the electrodes, said method comprising:

energizing the light source to emit a first pulse of light, during a first interval, following the first pulse of light, varying the potential of the first electrode relative to the second electrode in accordance with a first function such that the first electrode remains at a first polarity relative to the second electrode, energizing the light source to emit a second pulse of light, and during a second interval, following the second pulse of light, varying the potential of the first electrode relative to the second electrode in accordance with a second function such that the first electrode is of a second polarity, opposite the first polarity, relative to the second electrode, the integral with respect to time over the first and second intervals of the potential of the first electrode relative to the second electrode being essentially zero.

5. A method according to claim 4, wherein the durations of the first and second intervals are equal.

6. A method according to claim 4, wherein the potential of the first electrode relative to the second electrode during the first interval has one of at least two values and the potential of the first electrode relative to the second electrode during the second interval has one of at least two values, the potentials during the second interval being equal in magnitude and opposite in polarity to the potentials in the first interval.

7. A method according to claim 4, wherein the function that relates the potential of the first electrode relative to the second electrode to time during the first interval is equal to the function that relates the potential of the second electrode relative to the first electrode to time during the second interval.

8. A method of operating an electrooptic directional coupler comprising a body of electrooptic material having first and second waveguides formed therein and first and second electrodes positioned relative to the waveguides for influencing coupling between a segment of the first waveguide and a segment of the second waveguide, said method comprising:

launching a periodic succession of light pulses into the first waveguide, during a first interval, commencing after a first light pulse has entered the first waveguide and having a duration no longer than the period of the succession of light pulses, varying the potential of the first electrode relative to the second electrode in accordance with a first function, and during a second interval, commencing after a second light pulse has entered the first waveguide and having a duration no longer than the period of the succession of light pulses, varying the potential of the first electrode relative to the second electrode in accordance with a second function, the first and second functions being such that the integral with respect to time over the first and second intervals of the potential of the first electrode relative to the second electrode is essentially zero.

9. A method according to claim 8, wherein the body of electrooptic material has a main face and the first and second electrodes are formed on the main face of the body of electrooptic material, respectively superjacent said segment of the first waveguide and said segment of the second waveguide.

10. Optical apparatus comprising:

a light source, light source driver means for energizing the light source to emit pulses of light, an electrooptic directional coupler comprising a body of electrooptic material having first and second waveguides formed therein and an electrode structure positioned relative to the waveguides for influencing coupling between a segment of the first waveguide and a segment of the second waveguide, the light source being in optically coupled relationship with the first waveguide, electrode driver means connected to the electrode structure for establishing an electric field in the body of electrooptic material, control means connected to the light source driver means and operative to cause the light source driver means to energize the light source periodically, the control means also being connected to the electrode driver means and being operative to cause the electrode driver means to establish an electric field that varies cyclically with the same period as the energization of the light source, the integral of the electric field over a time equal to an integral multiple of said period being essentially zero.

11. Apparatus according to claim 10, wherein the body of electrooptic material has a main face and the electrode structure is formed on said main face of the body of electrooptic material superjacent the segment of the first waveguide and the segment of the second waveguide.

12. A method of operating an electrooptic modulator comprising a body of electrooptic material having at least one waveguide formed therein, said method comprising:

during a first interval, establishing an electric field in a first direction in a length segment of the waveguide, the electric field having a first magnitude during at least a first finite part of the first interval and a second magnitude at all other times during the first interval, and during a second interval, establishing an electric field in a second direction, opposite said first direction, in said length segment of the waveguide, the electric field having a first magnitude during at least a first finite part of the second interval and a second magnitude at all other times during the second interval, such that the integral with respect to time over the first and second intervals of the field in said length segment of the waveguide is essentially zero.

13. A method according to claim 12, wherein the first and second magnitudes of electric field established during the first interval are equal respectively to the first and second magnitudes of electric field established during the second interval.

14. A method of operating an electrooptic modulator comprising a body of electrooptic material having at least one waveguide formed therein, said method comprising establishing an electric field in a length segment of the waveguide, the electric field having first and second different values during first and second finite parts respectively of a first interval and having third and fourth different values during first and second finite parts respectively of a second interval, the first and second electric field values having a first direction and the third and fourth electric field values having a second direction, opposite said first direction, and the integral with respect to time over the first and second intervals of the field in said length segment of the waveguide being essentially zero.

15. A method according to claim 13, wherein the electric field has said first direction at all times during the first interval and has said second direction at all times during said second interval.

16. A method according to claim 13, wherein the electric field has either the first value or the second value at all times during the first interval and has either the third value or the fourth value at all times during the second interval.

17. A method according to claim 15, wherein the magnitudes of the first and second electric field values are equal to the magnitudes of the third and fourth electric field values respectively.

18. A method according to claim 13, wherein the durations of the first and second intervals are equal.

19. A method according to claim 13, wherein first and second electrodes are formed on the body of electrooptic material and the electric field is established by applying selected potentials to the first and second electrodes, and wherein the function that relates the potential of the first electrode relative to the second electrode to time during the first interval is equal to the function that relates the potential of the second electrode relative to the first electrode to time during the second interval.

* * * * *